US009262108B2

(12) United States Patent
Iwashima

(10) Patent No.: US 9,262,108 B2
(45) Date of Patent: Feb. 16, 2016

(54) DATA SETTING SYSTEM AND DATA SETTING METHOD THAT USE OPTICAL-COMMUNICATION

(71) Applicant: KYOCERA Document Solutions Inc., Osaka (JP)

(72) Inventor: Yasuhiro Iwashima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/583,603

(22) Filed: Dec. 27, 2014

(65) Prior Publication Data

US 2015/0186088 A1 Jul. 2, 2015

(30) Foreign Application Priority Data

Dec. 27, 2013 (JP) .................................. 2013-271842

(51) Int. Cl.
*G06K 15/02* (2006.01)
*G06F 3/12* (2006.01)
*H04N 1/00* (2006.01)

(52) U.S. Cl.
CPC ............ *G06F 3/1254* (2013.01); *G06F 3/1211* (2013.01); *H04N 1/00204* (2013.01); *H04N 1/00835* (2013.01); *H04N 1/00962* (2013.01); *H04N 2201/007* (2013.01); *H04N 2201/0022* (2013.01); *H04N 2201/0025* (2013.01); *H04N 2201/0053* (2013.01); *H04N 2201/0094* (2013.01)

(58) Field of Classification Search
CPC ................. G01J 1/00; G01J 3/00; G01J 4/00; G01J 5/00; G01J 7/00; G01J 9/00; G01J 11/00
USPC ................................ 358/1.1–3.31, 1.11–1.18
See application file for complete search history.

(56) References Cited

U.S. PATENT DOCUMENTS

2009/0171571 A1 7/2009 Son et al.
2013/0141554 A1 6/2013 Ganick et al.
2013/0321840 A1 12/2013 Yamamoto

FOREIGN PATENT DOCUMENTS

JP H05-169356 A 7/1993

*Primary Examiner* — Marcellus Augustin
(74) *Attorney, Agent, or Firm* — Hawaii Patent Services; Nathaniel K. Fedde; Kenton N. Fedde

(57) ABSTRACT

Provided is a data setting system that has an image forming apparatus provided with an image reading part, and the communication terminal apparatus provided with a light irradiating part. The image forming apparatus is provided with an optical-communication receive part and an optical-communication execution part. The optical-communication receive part receives an external light signal by using an image reading part. The optical-communication execution part performs a setup of the data corresponding to the received light signal. The communication terminal apparatus is provided with an optical-communication sending part. The optical-communication sending part sends the light signal corresponding to a setup of data using a light irradiating part.

12 Claims, 7 Drawing Sheets

DATA SETTING SYSTEM AND DATA SETTING METHOD THAT USE OPTICAL-COMMUNICATION

INCORPORATION BY REFERENCE

This application is based on and claims the benefit of priority from Japanese Patent Application No. 2013-271842 filed on Dec. 27, 2013, the contents of which are hereby incorporated by reference.

BACKGROUND

The present disclosure is related with a data setting system and a data setting method.

In detail, it is related with the data setting system and data setting method that can set up data by using a scanner unit without connecting physically.

Typically, there are some technology for performing adjustment and inspection work without contact to an apparatus on a production line. For example, there is a typical adjustment and an inspection method for the subject for adjustment and examination in a production line. In this method, each of the subject of adjustment and examination including an electronic circuit, which is conveyed on the production line one by one, required adjustment and inspection are performed at a stations in each. In this case, at the stations in each, bidirectional optical communication is performed between the subject of adjustment and examination in a carrying state or a conveyance idle state, and a control unit attached to the station. Thus, required adjustment and inspection are to be conducted. Therefore, required adjustment and inspection are performed at the stations in each of the subject of adjustment and examination including an electronic circuit, which is conveyed on the production line one by one. In this case, it is not based on mechanical electric connection between the subject of adjustment and examination in the carrying state or the conveyance idle state, and the control unit attached to that station. Moreover, it is supposed that required adjustment and inspection are noncontact states, and is moreover conducted promptly.

SUMMARY

The data setting system of the present disclosure is a data setting system that has the image forming apparatus having an image reading part, and a communication terminal apparatus having a light irradiating part. The image forming apparatus has an optical-communication receive part and an optical-communication execution part. The optical-communication receive part receives an external light signal by using an image reading part. The optical-communication execution part performs a setup of the data corresponding to the received light signal. The communication terminal apparatus has an optical-communication sending part. The optical-communication sending part sends the light signal corresponding to the setup of data by using a light irradiating part.

The data setting method of the present disclosure is a data setting method of a data setting system that has an image forming apparatus having an image reading part, and a communication terminal apparatus having a light irradiating part. In the data setting method of the present disclosure, it has a step that receives an external light signal with an image forming apparatus by using an image reading part. It has a step that sends the light signal corresponding to a setup of data with a communication terminal apparatus using a light irradiating part. It has a step that performs a setup of the data corresponding to the light signal received with an image forming apparatus.

DETAILED DESCRIPTION

In the following, as refer to an accompanying drawing, an embodiment of a data setting system of the present disclosure is described for understanding of the present disclosure is presented. In addition, the following embodiments are examples that embodied the present disclosure and are not the disclosure that limits the technical scope in the present disclosure. Also, alphabet "S" shown before the number in the flow chart means a step.

<Data Setting System>

In the following, data setting system 1 that is a data setting system related to the embodiment of the present disclosure is explained. Data setting system 1 has the image forming apparatus having the scanner unit (image reading part 103), and communication terminal apparatus 300 having light irradiating part 200 for performing optical communications.

Figure 1:
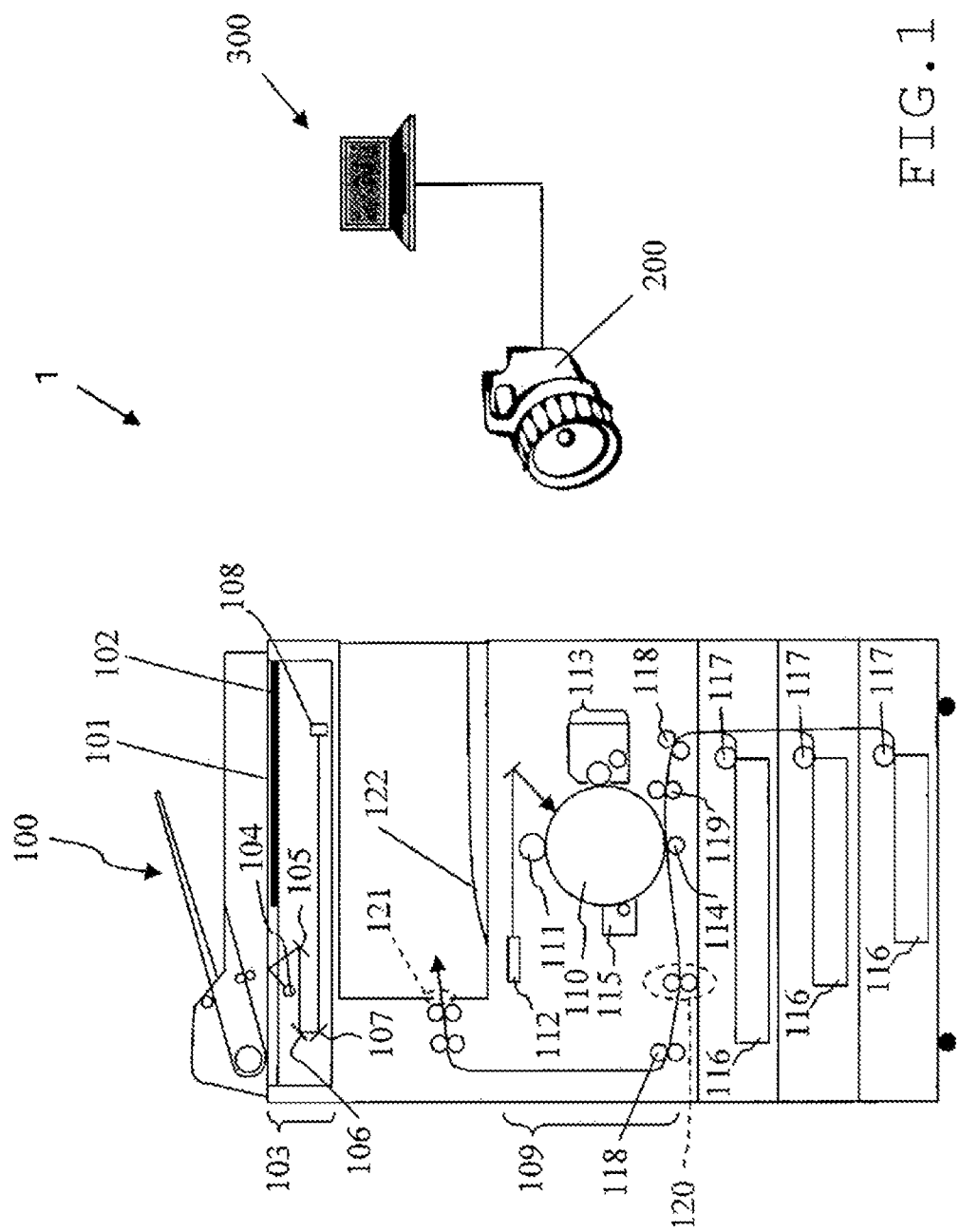
FIG. 1 is an outline diagram of the data setting system related to the embodiment of the present disclosure.

FIG. 1 is an outline diagram of the data setting system related to the embodiment of the present disclosure. However, the details of each part that is not directly related to the present disclosure are omitted. The image forming apparatus of data setting system 1 of the present disclosure corresponds for example, a MFP having functions, such as a copy, a scanner, and a printer. MFP 100 functions as an image processing apparatus provided with a copy function, a scanner function, a printer function, or the like.

In the following, operation of MFP 100 (MFP: Multi-Function Peripheral) is explained briefly, for example, in case that a user uses a copy function.

Firstly, if the user uses MFP 100, a manuscript is placed in manuscript stand 101 provided on the upper surface of the case part. Then, a user uses operation part 102 (operation panel) having near about manuscript stand 101. In this case, the input of the setups about image processing is inputted from the operation screen of the operation part 102. Then, when a user depresses the start key provided in the operation part 102, MFP 100 will start image processing (a copy function, and a printing job).

Then, in image reading part 103, the light irradiated from light source 104 is reflected by the manuscript placed on manuscript stand 101. The reflected light is led to image sensor 108 by mirrors 105, 106, and 107. Photoelectric conversion of the drawn light is performed by image sensor 108, and the image data corresponding to the manuscript is generated.

Now, the section that forms a toner image based on the image data is image formation part 109. The image formation part 109 has photo conductor drum 110. The photo conductor drum 110 rotates in the predetermined direction with constant speed. In the circumference, electrifying device 111, exposure unit 112, development counter 113, transfer equipment 114, cleaning unit 115, or the like, are arranged sequentially from an upstream of a direction of rotation.

The electrifying device 111 electrifies surface of photo conductor drum 110 uniformly. The exposure unit 112 irradiates the surface of electrified photo conductor drum 110 with laser based on the image data and forms an electrostatic latent image in it. The development counter 113 makes a toner adhere to the formed electrostatic latent image and forms a toner image in it. The formed toner image is transferred by the recording medium (for example, a paper or a sheet) with the transfer machine 114. The cleaning unit 115 removes the excessive toner left to the surface of photo conductor drum 110. These series of processes are performed by rotating photo conductor drum 110.

The sheet is conveyed from a plurality of sheet paper cassettes 116 equipped with MFP 100. When conveyed, the sheet is drawn out by pickup roller 117 from any one sheet paper cassette 116 to a carrying path. In each sheet paper cassette 116, the sheets that paper type are different, respectively, are stored. The sheet is fed based on the setups about image processing.

The sheet pulled out by the carrying path is sent between photo conductor drum 110 and transfer equipment 114 by conveying roller 118 or resist roller 119. When sent in, the toner image will be transferred with the transfer equipment 114, and the sheet will be conveyed by fixing apparatus 120.

The sheet in which the toner image has been transferred passes through between the heating rollers and the pressurizing rollers equipped with the fixing apparatus 120. Then, heat and pressure are applied to the toner image, and the sheet is fixed to a visible image. The quantity of heat of the heating roller is set up the optimal according to the paper type, and the fixing is performed appropriately. The visible image is fixed to the sheet and image formation is completed. The sheet is delivered to tray 122 provided in the body of a case part by conveying roller 118 via delivery port 121. The sheet is loaded into the tray 122 in the body and is stored. By the process, MFP 100 provides a copy function for a user.

Now, MFP 100 of data setting system 1 of the present disclosure uses image sensor 108 included in image reading part 103 (scanner unit). Thereby, optical communications are performed with communication terminal apparatus 300 via light irradiating part 200. Accordingly, a setup of data is performed, without direct connecting with communication terminal apparatus 300 physically (as described as follows).

Figure 2:
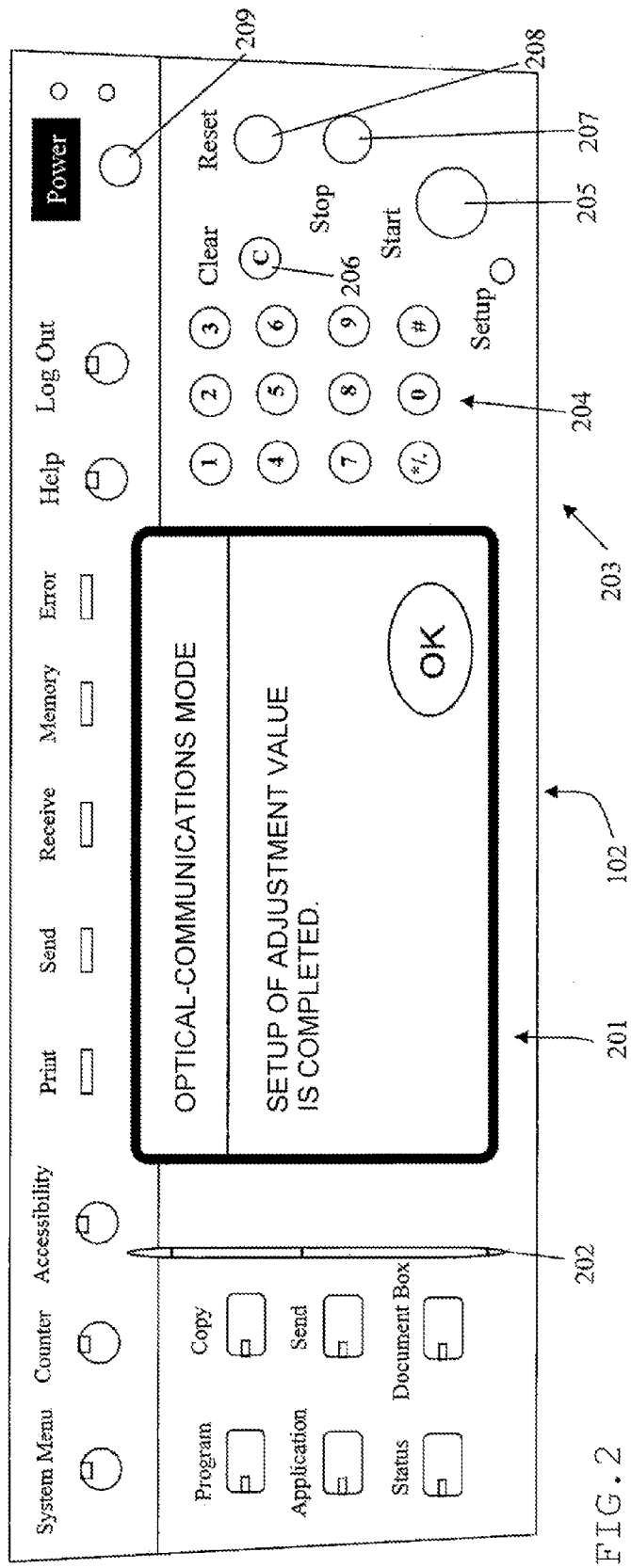
FIG. 2 is a conceptual diagram showing the entire configuration of the operation part related to the embodiment of the present disclosure.

FIG. 2 is a conceptual diagram showing the entire configuration of the operation part related to the embodiment of the present disclosure.

A user inputs the setups about the above image processing by using the operation part 102, and the user verifies the inputted setups. In case of inputting the setups, touch panel 201 (operation panel), touch pen 202, and operation key 203 having in the operation part 102 are used.

The touch panel 201 realizes the function to input setups and the function to show the setups. Namely, when the key in the screen showing on touch panel 201 is depressed, the setups corresponding to the pressed key are inputted.

On the back of touch panel 201, a display (not shown) is provided. For example, the display shows an operation screen, which is the initial screen, or the like, as mentioned above. Touch pen 202 is provided nearby the touch panel 201. When a user contacts the tip of the touch pen 202 on touch panel 201, the sensor provided under touch panel 201 will detect a contact point.

Further, operation key 203 of the predetermined number is provided near touch panel 201. For example, it has numeric keypad 204, start key 205, clear key 206, stop key 207, reset key 208, and power key 209.

Figure 3:
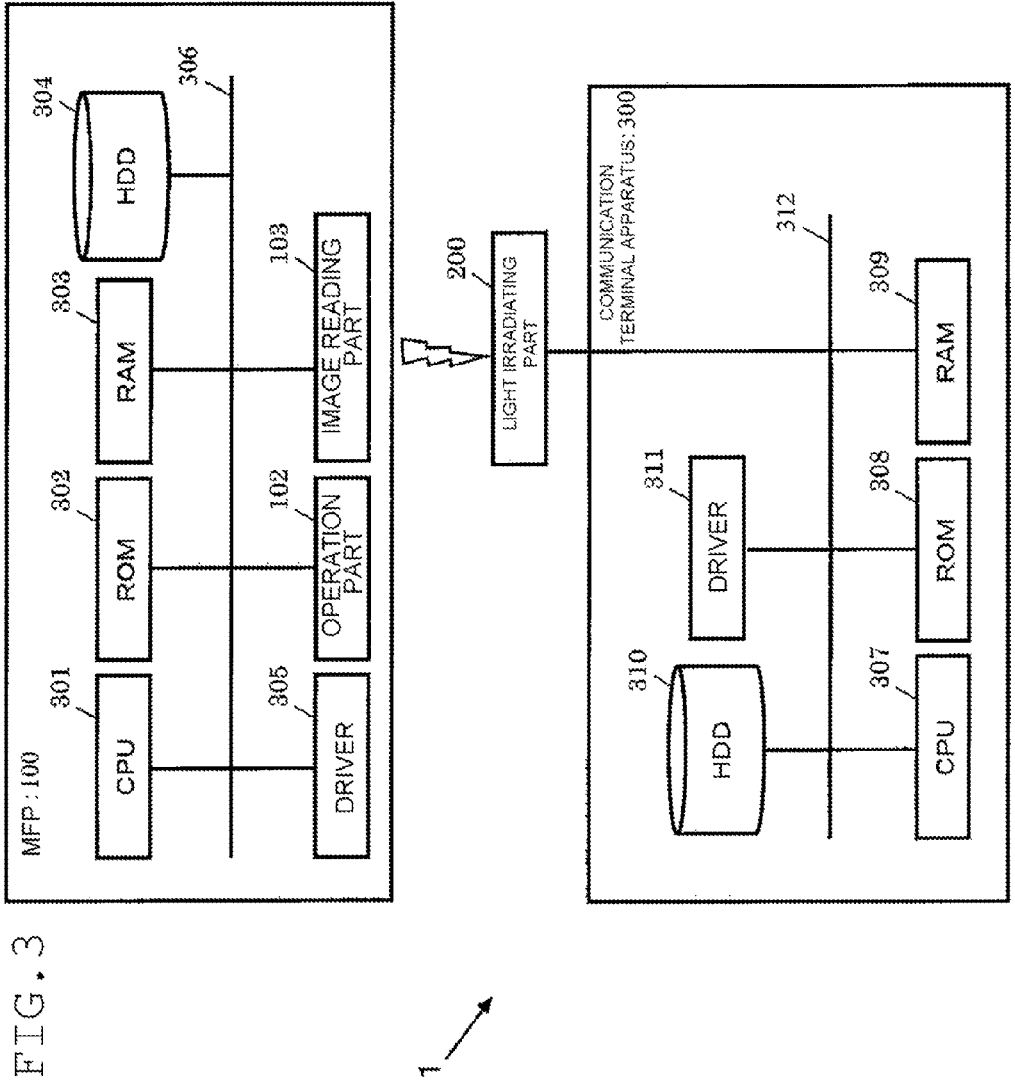
FIG. 3 is a figure showing the components of the control system hardware of the data setting system related to the present disclosure.

Then, by using FIG. 3, the components of the control system hardware of data setting system 1 are explained.

FIG. 3 is the figure showing the components of the control system hardware of the data setting system related to the present disclosure. However, the details of each part that is not directly related to the present disclosure are omitted.

The control circuit of MFP 100 of data setting system 1 includes CPU 301 (Central Processing Unit), ROM 302 (Read Only Memory), RAM 303 (Random Access Memory), HDD 304 (Hard Disk Drive), driver 305, operation part 102, and image reading part 103. Driver 305 corresponds to each actuator. Also, each part is connected with internal bus 306.

The CPU 301 uses the RAM 303 as workspace, for example. CPU 301 executes the program memorized in ROM 302, HDD 304, or the like. CPU 301 transfers and receives data, instructions and a signal, a command, or the like, from driver 305, operation part 102, and image reading part 103, based on the executed result. Then, CPU 301 controls operation of each actuator as shown in FIG. 1.

In addition, the control circuit of communication terminal apparatus 300 of data setting system 1 has connected CPU 307, ROM 308, RAM 309, HDD 310, driver 311, and light irradiating part 200 with internal bus 312. The function of each member is the same as that of above-mentioned.

<The Embodiment of the Present Disclosure>

Figure 4:
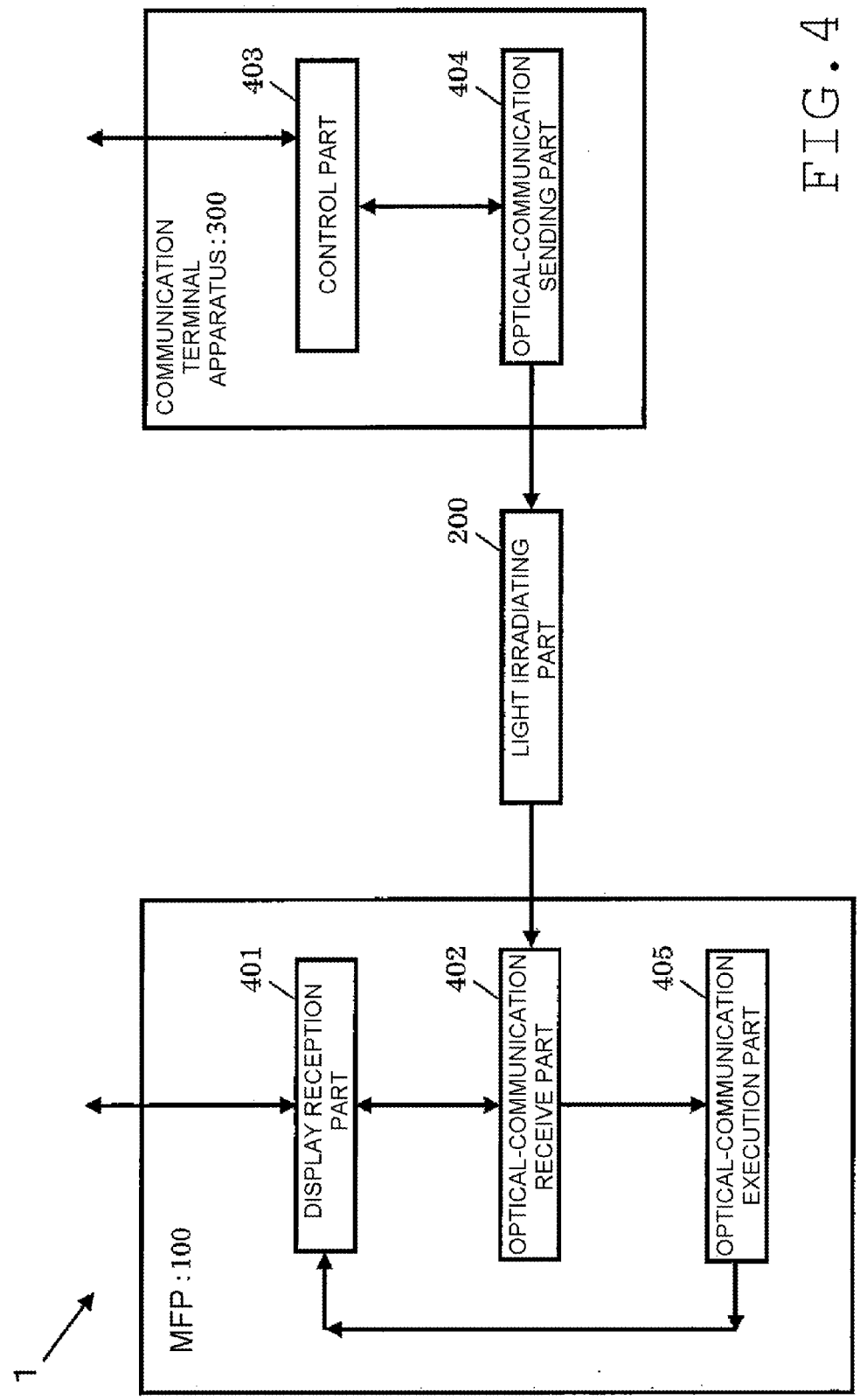
FIG. 4 is a functional block diagram of the data setting system of the present disclosure.
Figure 5:
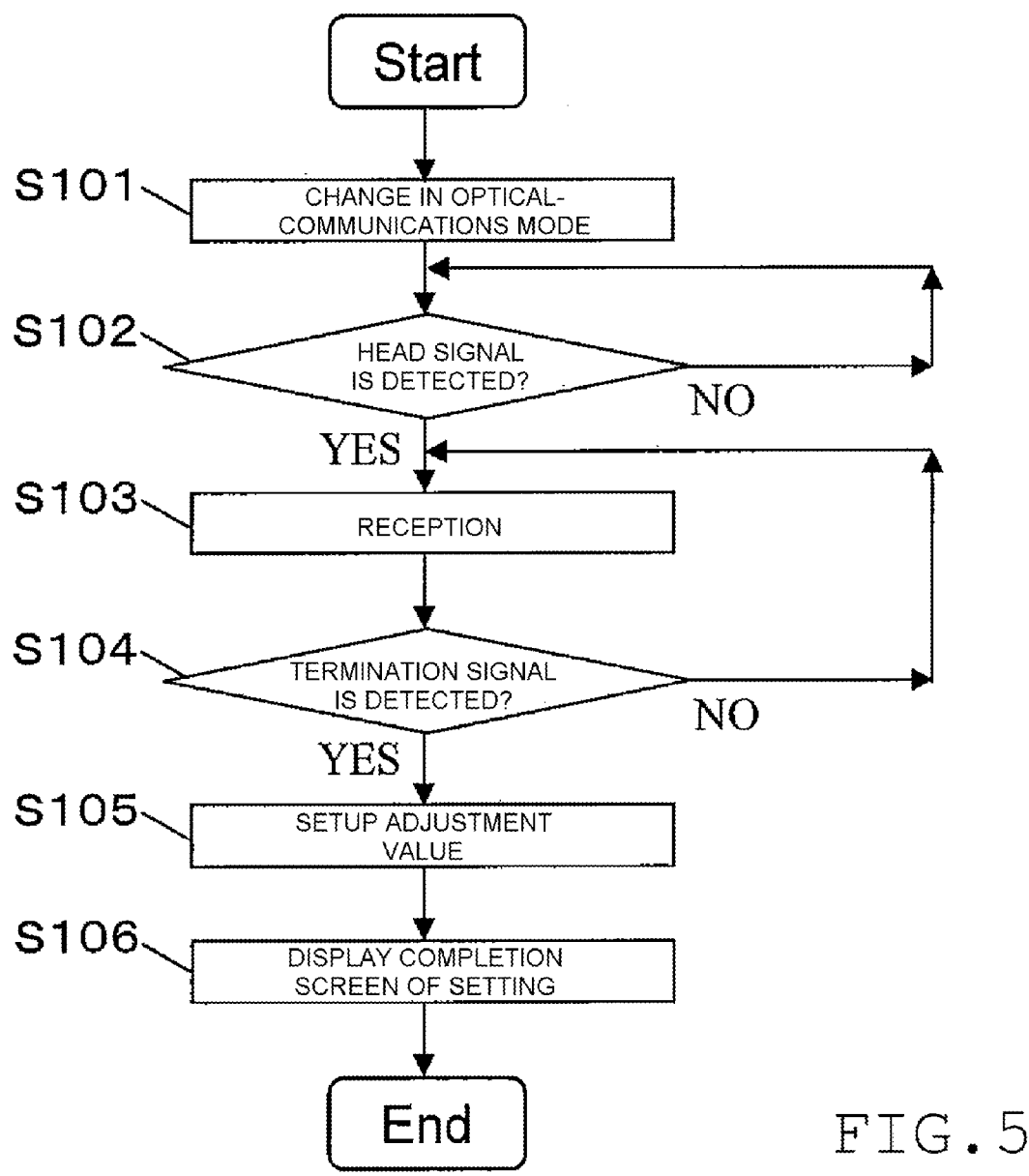
FIG. 5 is a flow chart for the process of performing of the present disclosure.

Then, as refer to FIG. 4 and FIG. 5, the components and performing the process related to the embodiment of the present disclosure is explained.

FIG. 4 is a functional block diagram of the data setting system in the present disclosure. FIG. 5 is a flow chart showing the process of performing of the present disclosure.

Figure 6A:
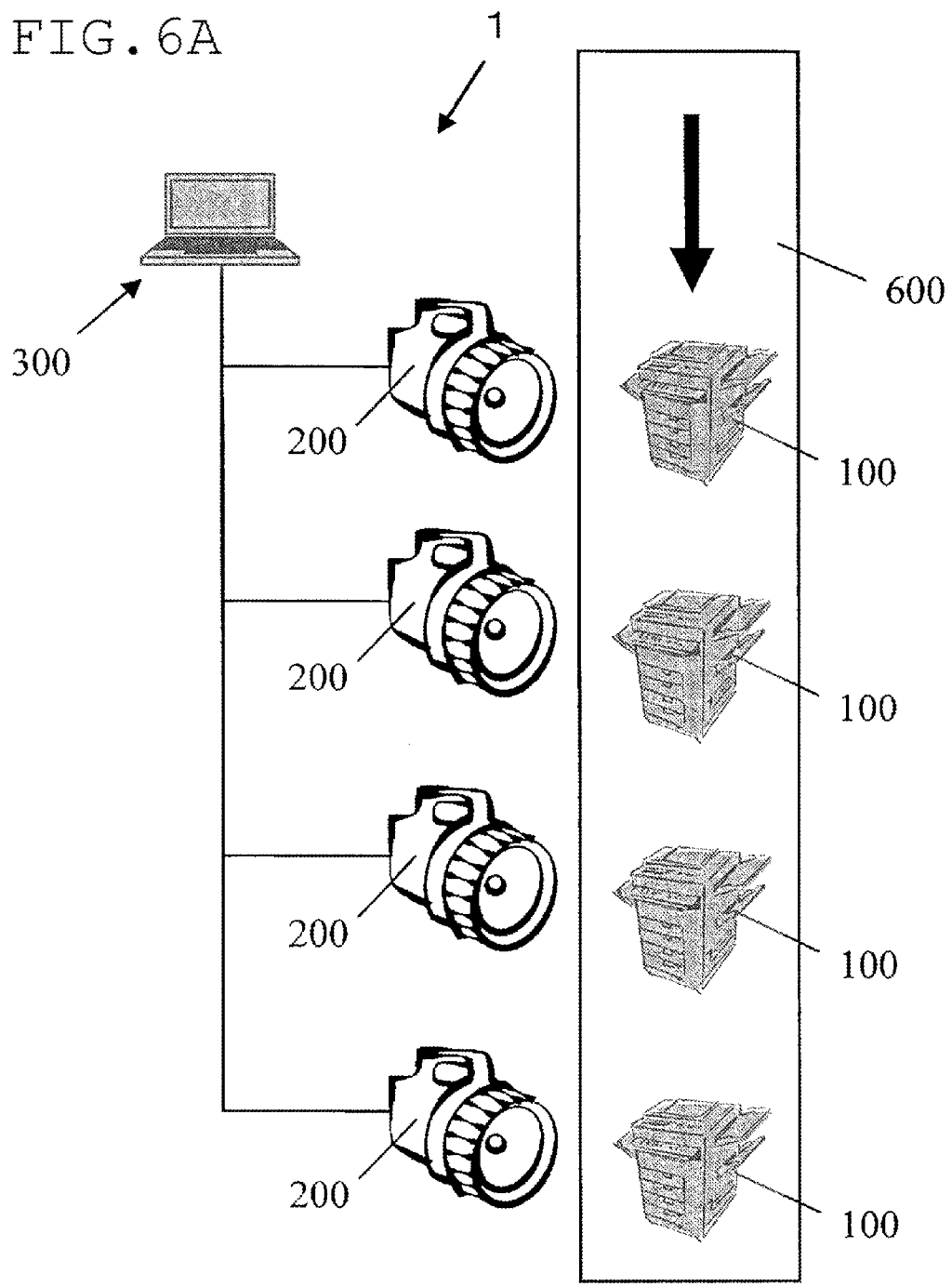
FIG. 6A is the FIG. showing a first example of the data setting system of the present disclosure.

Firstly, MFP 100 that the work of an assembly or the like completed proceeds to the process of an adjustment value setup. Then, MFP 100 is put on the predetermined conveyor of a production line. This production line is suitably changed by the classification of MFP 100. Conveyor 600 runs toward light irradiating part 200 of communication terminal apparatus 300, as shown in FIG. 6A.

In this case, an operator exposes manuscript stand 101 of MFP 100 outside, and it becomes a state where image reading part 103 can receive an external light. Also, the operator inputs proceed to optical-communications mode into MFP 100 via the key operation of operation part 102. Then, display reception part 401 of MFP 100 receives proceeding to the optical-communications mode and notifies that to optical communication part 402. Optical-communication receive part 402 that received the notice starts image sensor 108 of image reading part 103. Then, optical-communication receive part 402 is changed from normal mode to the optical-communications mode that can receive an external light via the image reading part 103 (FIG. 5: S101).

Thereby, optical-communication receive part 402 becomes in the state that optical communications are possible. Optical-communications receive section 402 receives an external light, and it starts detection of the head signal of the received light signal (FIG. 5: S102).

Here, to detect the head signal of optical communications by optical-communication receive part 402, any kind of methods may be used. However, for example, when optical-communication receive part 402 receives an external light, the method of comparing the received light signal and the head signal previously set up by the manufacturer can be mentioned. In this case, only if the light signal matches with the head signal, the head signal is detected.

Further, if optical-communication receive part 402 cannot detect the head signal in the case of reception of light (FIG. 5: NO in S102), unless cancel the optical-communications mode, detection of the head signal will be repeated.

Now, when MFP 100 completes a change in the optical-communications mode, for example, via touch panel 201 of operation part 102, the completion screen of changing is shown. When the operator verifies the screen, then, goes to communication terminal apparatus 300 of data setting system 1, and starts communication terminal apparatus 300. Then, control part 403 of communication terminal apparatus 300 shows a predetermined operation screen. The operator inputs an optical-communications start instruction into communication terminal apparatus 300 via a mouse, a keyboard, or the like. Then, in response, control part 403 of communication terminal apparatus 300 notifies that effect to optical-communication sending part 404. Optical-communication sending part 404 that received the notice sends the light signal corresponding to the setup of data by using light irradiating part 200 connected to communication terminal apparatus 300.

Here, any kind of method may be sufficient in the way that optical-communication sending part 404 sends a light signal. However, for example, optical-communication sending part 404 converts into a light signal the command that starts the setting process of the adjustment value used as data and the adjustment value of data. In this case, optical-communication sending part 404 sends the converted light signal via light irradiating part 200. Here, adjustment values are destination information (for Japan, for the United States, or the like), a serial number, or the like, for example. Thereby, the light irradiated from light irradiating part 200 will be sent outside as the light signal.

In addition, in the present disclosure, optical communications is one way from communication terminal apparatus 300 to MFP 100. Therefore, optical-communication sending part 404 repeats and sends a series of light signals required for the setup of the adjustment value. Thereby, optical-communication receive part 402 in MFP 100 enables to receive the light signal certainly.

Further, optical-communication sending part 404 arranges the head signal and the termination signal to a head and an end in the light signals, respectively. Thereby, optical-communication receive part 402 of MFP 100 that receives the light signal becomes possible to identify the head and the end of the light signal.

Also, light irradiating part 200 that optical-communication sending part 404 uses, any kind of a member in which optical communications are possible may be sufficient. For example, a light source for visible light communications can be mentioned.

Now, during optical-communication sending part 404 of communication terminal apparatus 300 sending the light signal, MFP 100 on conveyor 600 is conveyed and passed a lower part of light irradiating part 200. In that case, optical-communication receive part 402 of MFP 100 detects the head signal of optical communications (FIG. 5: YES in S102) and starts reception of the light signal from the head signal (FIG. 5: S103).

Then, reception of the light signal of optical-communication receive part 402 is continuously performed (FIG. 5: S103) until it detects the termination signal of the light signal (FIG. 5: NO in S104). Detection of the termination signal of optical communications is the similar manner as that of the head signal. That is, optical-communication receive part 402 compares the received light signal and the termination signal previously set up by the manufacturer. If the light signal matches with the termination signal, the termination signal is detected.

Now, when optical-communication receive part 402 detects the termination signal (FIG. 5: YES in S104), reception of the light signal will be completed and that effect will be notified to optical-communication execution part 405. Optical-communication execution part 405 that received the notice performs a setup of the adjustment value corresponding to the received light signal (FIG. 5: S105).

Here, any kind of method may be sufficient as the way optical-communication execution part 405 performs a setup of the adjustment value. However, for example, optical-communication execution part 405 may convert a command, an adjustment value, or the like, that start the setting process of the adjustment value as the received light signal. In this case, optical-communication execution part 405 executes the converted command and performs setting process of the adjustment value. Thereby, even if MFP 100 and communication terminal apparatus 300 are not connected physically, a setup of the adjustment value can be done.

Now, when optical-communication execution part 405 completes performing of the setup of the adjustment value, that effect is notified to display reception part 401. When received the notice, as shown in FIG. 2, display reception part 401 shows the completion screen about setting of the setup of the adjustment value having been completed on touch panel 201 (FIG. 5: S106). In particular, in the present disclosure, one way optical communications from communication terminal apparatus 300 is mentioned. Accordingly, completion of the setup of the adjustment value of MFP 100 cannot be verified from communication terminal apparatus 300. Therefore, by the completion screen of the setting, the operator can be verified the setup of the adjustment value of MFP 100 is completed, visually.

Also, for example, it is composed that an imaging parts, such as a camera, are further provided in communication terminal apparatus 300, and the imaging part can be taken an image of the completion screen of the setting for MFP 100. In this case, control part 403 checks that the setup of the adjustment value of MFP 100 has been completed based on the taken image of the completion screen of the setting. Thereby, not only visual inspection by the operator but the automatic check by communication terminal apparatus 300 is attained.

In this way, by using image reading part 103 of MFP 100, it becomes possible, without using physical connection, to set up the adjustment value by optical communications. Also, since image reading part 103 always exists in MFP 100, by using it effectively with optical communications, it becomes possible to avoid the increase number for new parts.

In the present disclosure, when MFP 100 only flows on conveyor 600 of the production line, it becomes possible to carry out a setup of the adjustment value of MFP 100, and there is no connection of a telecommunication cable by the operator. Therefore, it becomes possible to reduce a burden to the operator remarkably.

In addition, the optical communications performed with image sensor 108 of image reading part 103 are considered to be a low speed as compared with general optical communications. However, it can be fully supported for the setup of the adjustment value.

Further, modification of the adjustment value can be easily performed by setting up the adjustment value with the optical communications as mentioned above. Therefore, it becomes possible to apply suitably in case that the production of MFP 100 is as various kinds of small quantity, for example.

Also, in the above-mentioned, it is configured that an operator performs key operation to the start, which is inputting proceeding to optical-communications mode (instructions,) into display reception part 401 in MFP 100, and then optical-communication receive part 402 proceeds to optical-communications mode. However, other components may be used.

For example, optical-communication receive part 402 may refer to an internal memory about the setup of the adjustment value in MFP 100. In this case, optical-communication receive part 402 may be configured to shift to optical-communications mode from normal mode, automatically. As this case, the adjustment value may not be input in the area of a predetermined memory, and it may be a case of a blank. Thereby, it becomes possible to further remove time and effort for the operator.

In addition, above-mentioned, as shown in FIG. 6A, a plurality of light irradiating parts 200 are arranged in series along the direction of movement of one conveyor 600. Further, it is configured that communication terminal apparatus 300 sends the same light signal from every light irradiating part 200, and optical communications are performed each of a plurality of MFP 100 on conveyor 600. However, the other configuration is acceptable. For example, the area that can send the light signal on conveyor 600 is determined for a specified light irradiating part 200, a shield (cover) is provided in the area, and only the light signal from the specified light irradiating part 200 can be received in the area. By this configuration, it becomes possible to prevent the optical-communications omission, or the like, for MFP 100 included in the area.

Also, while providing such area for every light irradiating part 200, each light signal sent by light irradiating part 200 can be corresponded to each part of setting process for various data. For example, as shown in FIG. 6A, four sets of light irradiating parts 200 is provided in series along the direction of movement of conveyor 600. In this case, the first light irradiating part 200 irradiates with the light signal of an initializing step. The following light irradiating part 200 irradiates with the light signal of the first adjusting process. The third light irradiating part 200 irradiates with the light signal of the second adjusting process. The last light irradiating part 200 irradiates with the light signal of a check process. In this way, a series of data setting processes are corresponded as for each light irradiating part 200.

Thereby, while conveying MFP 100 on conveyor 600, it can be performed a series of data setting processes without physical connection.

In addition, the data setting is possible when MFP 100 passes within the area where the light of light irradiating part 200 reaches. Therefore, there is an advantage to realize even if it designs the shape of conveyor 600 for a production line freely.

Also, in the present disclosure, it becomes possible that a plurality of MFP 100 are put on the same area and carry out a setup of data for all the MFP 100 collectively by one light irradiating part 200.

Figure 6B:
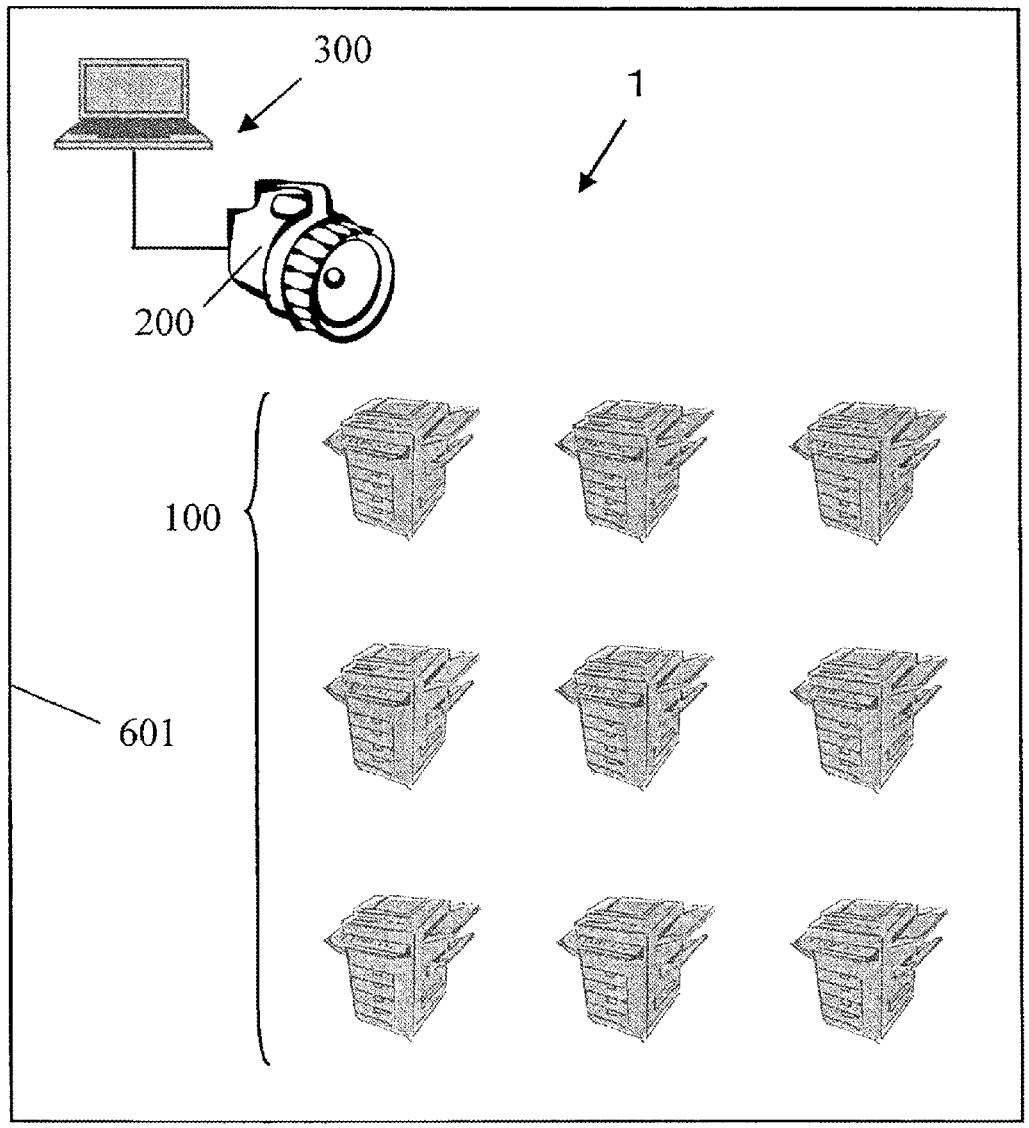
FIG. 6B is the FIG. showing a second example of the data setting system of the present disclosure.

For example, as shown in FIG. 6B, area 601 in which the optical communications of one light irradiating part 200 are possible (area that the light of light irradiating part 200 reaches) may be determined.

In this case, the light signal of the light irradiating part 200 is sent only to that area. Then, an operator conveys a plurality of MFP 100 in the room of the area 601. The operator operates each MFP 100, opens manuscript stand 101 (manuscript mat) of MFP 100, and enables it to receive an external light for image reading part 103. Then, an operator changes optical-communication receive part 402 of MFP 100 into the states in which optical communications are possible (for example, FW (firmware) update mode in optical-communications mode, or the like.)

Also, the operator operates communication terminal apparatus 300 and makes a light signal send to optical-communication sending part 404 via light irradiating part 200.

Here, when optical-communication receive part 402 of a plurality of MFP 100 detects the head signal of the light signal, reception of a light signal will be started and reception of the light signal will be continued to detection of the termination signal. Then, when optical-communication receive part 402 completes reception of the light signal, optical-communication execution part 405 will perform the setup of the data corresponding to the light signal. Here, if it is FW update, optical-communication execution part 405 will perform a reboot at the end and will complete FW update.

In this way, by collecting a plurality of MFP 100 on predetermined area 601 and by performing optical communications, the data of all the MFP 100 can be set up simultaneously. Also, it becomes possible to reduce remarkably the time and effort of the data setting in every MFP 100. In case that a setup of such data is correspond to the process of update of FW (firmware) for MFP 100, this update for one MFP 100 does not consume too much time and effort. However, by carrying out for every set, it needs large time and effort. Also, the update process differs from normal work on conveyor 600 on the production line. Therefore, it is necessary to carry out by many workers.

By using the present disclosure, for example, when a plurality of MFP 100 are collectively conveyed in the room corresponding to the area, and optical communications are carried out. The process enables to update all the MFP 100 collectively, it becomes possible to perform time reduction and personnel reduction greatly.

In this way, in the present disclosure, MFP 100 includes optical-communication receive part 402 that receives an external light signal by using image reading part 103 and optical-communication execution part 405 that performs a setup of data corresponding to the received light signal.

Also, communication terminal apparatus 300 provides optical-communication sending part 404 that sends the light signal corresponding to the setup of data by using light irradiating part 200.

Thereby, it becomes possible to set up data by using a scanner unit without connecting physically.

Also, in the embodiment of the present disclosure, although the image forming apparatus is MFP 100, there is no particular limitation, and an image forming apparatus that has image reading part 103 can be used.

Also, although the communication terminal apparatus is personal computer 300, a personal digital assistant apparatus, a tablet type terminal unit, or the like may be used if sending of a light signal is possible by using light irradiating part 200.

Also, in the embodiment of the present disclosure, although a setup of an adjustment value and FW update are mentioned as a setup of data, there will be no limitation in particular if it is the setting process to input data.

Also, in the embodiment of the present disclosure, although it is configured that data setting system 1 provides each part, the program that realizes each part may be stored in a recording medium, and it is configured that the recording medium may be provided.

In the configuration, the program is read to an image forming apparatus or a communication terminal apparatus, and the image forming apparatus and the communication terminal apparatus realize each part as above.

In that case, the program itself read from the recording medium produces the operation effect of the present disclosure. It is also possible to provide as a method of storing the step performed each part in a hard disk.

As mentioned above, the data setting system and data setting method related to the present disclosure are useful as well as a MFP to the data setting system that has a copying machine, a printer, a terminal unit, a tablet type terminal unit, a notebook computer, a personal digital assistant apparatus, or the like.

Also, it is effective, by using a scanner unit, as data setting system and a data setting method that can set up data without connecting physically.

As summarized, for a typical image forming apparatus provided with scanner units, such as a MFP and a copying machine, when shipping to a shipment place, a setup that sets adjustment values, such as destination information and a serial number, to the apparatus is performed. It is usually necessary to perform such setup for every apparatus. Therefore, for a plurality of apparatus arranged in series on the conveyor of the existing production line, an operator connects a telecommunication cable (for example, USB cable) from the existing dedicated terminal (personal computer for exclusive use).

Also, the adjustment value of each apparatus is set up by transmitting a command and an adjustment value from the dedicated terminal.

However, for such setup, each apparatus and a dedicated terminal need to be physically connected via the telecommunication cable.

Therefore, there is a problem that the setup can be advanced only in the range in which the telecommunication cable reaches to the apparatus on the conveyor.

Also, the operator brings the telecommunication cable to the apparatus on the conveyor when performing the setup, the apparatus is connected with it, and the setup is performed by using the dedicated terminal.

Furthermore, the setup of one apparatus is completed by detaching the telecommunication cable that is connected. That is, there is a problem that the setup of one apparatus takes time and effort so much.

On the other hand, the method of building wireless LAN, such as WiFi, is also considered.

However, for the method, naturally, a wireless LAN adapter is needed for each apparatus, and there is a problem of making the part of the apparatus increase.

It is unsolvable to such a problem for a typical case.

In the present disclosure, the data setting system and data setting method that can set up data by using a scanner unit without connecting physically are provided.

That is, according to the data setting system and data setting method in the present disclosure, it becomes possible to set up data by using a scanner unit without connecting physically.

Also, the present disclosure can be provided as a program for performing a computer that can be transmitted individually via electric telecommunication lines, or the like.

In this case, Central Processing Unit (CPU) collaborates with each circuits other than CPU according to the program in the present disclosure and realizes a control action.

Also, each part realized by using the program and CPU can also be configured by using hardware for exclusive use.

Also, the program is possible to circulate in the state recorded on recording medium readable for a computer, such as CD-ROM, or the like.

What is claimed is:

1. A data setting system that includes an image forming apparatus having an image reading part and a communication terminal apparatus having a light irradiating part, wherein
   the image forming apparatus has an optical-communication receive part that receives an external light signal by using the image reading part, and an optical-communication execution part that performs a setup of data corresponding to the light signal of being received;
   the communication terminal apparatus has an optical-communication sending part that sends the light signal corresponding to set the data by using the light irradiating part; and
   the optical-communication execution part shows a completion screen of the setting on an operation part when completing to perform the setup of the data.

2. The data setting system of claim 1, wherein the image reading part is an image sensor of a scanner unit.

3. The data setting system of claim 1, wherein:
   the optical-communication sending part repeatedly sends a series of light signals that has arranged a head signal at a head and a termination signal at an end, respectively, and
   the optical-communication receive part starts reception of the light signal when the head signal is detected and completes reception of the light signal when the termination signal is detected within the light signal.

4. A data setting system that includes an image forming apparatus having an image reading part and a communication terminal apparatus having a light irradiating part, wherein
   the image forming apparatus has an optical-communication receive part that receives an external light signal by using the image reading part, and an optical-communication execution part that performs a setup of data corresponding to the light signal of being received;
   the communication terminal apparatus has an optical-communication sending part that sends the light signal corresponding to set the data by using the light irradiating part; and
   the optical-communication receive part starts reception of the external light signal, when an input of instructions by an operator is received or when there is no data for the setup to an area of a predetermined memory.

5. The data setting system of claim 4, wherein the image reading part is an image sensor of a scanner unit.

6. The data setting system of claim 4, wherein:
   the optical-communication sending part repeatedly sends a series of light signals that has arranged a head signal at a head and a termination signal at an end, respectively, and
   the optical-communication receive part starts reception of the light signal when the head signal is detected and completes reception of the light signal when the termination signal is detected within the light signal.

7. A data setting method of a data setting system that includes an image forming apparatus having an image reading part and a communication terminal apparatus having a light irradiating part, comprising the steps of:

receiving an external light signal with the image forming apparatus by using an image reading part;

sending the light signal corresponding to a setup of data with the communication terminal apparatus by using a light irradiating part;

performing the setup of the data corresponding to the light signal in the image forming apparatus; and following completion of the step of performing the setup of the data, showing a screen on the image forming apparatus that provides verification of completion of the step of performing the setup of the data.

8. The data setting method of claim 7, wherein the image reading part is an image sensor of a scanner unit.

9. The data setting method of claim 7, wherein:

the step of sending the light signal comprises sending a series of light signals that has arranged a head signal at a head and a termination signal at an end, respectively, and the step of receiving an external light signal is started when the head signal is detected and completes when the termination signal is detected within the light signal.

10. A data setting method of a data setting system that includes an image forming apparatus having an image reading part and a communication terminal apparatus having a light irradiating part, comprising the steps of:

receiving an external light signal with the image forming apparatus by using an image reading part;

sending the light signal corresponding to a setup of data with the communication terminal apparatus by using a light irradiating part; and performing the setup of the data corresponding to the light signal in the image forming apparatus;

wherein the step of receiving an external light signal is started when an input of instructions by an operator is received or when the image forming apparatus determines there is no data for the setup in an area of a predetermined memory.

11. The data setting method of claim 10, wherein the image reading part is an image sensor of a scanner unit.

12. The data setting method of claim 10, wherein:

the step of sending the light signal comprises sending a series of light signals that has arranged a head signal at a head and a termination signal at an end, respectively, and the step of receiving an external light signal is started when the head signal is detected and completes when the termination signal is detected within the light signal.

* * * * *